April 29, 1924.

R. B. JOHNSTON

METHOD AND APPARATUS FOR SHELLING PALM NUTS

Filed July 28, 1923

INVENTOR
Robert B. Johnston
BY
Meyers & Cavanagh
ATTORNEYS

April 29, 1924.

R. B. JOHNSTON

METHOD AND APPARATUS FOR SHELLING PALM NUTS

Filed July 28, 1923  3 Sheets-Sheet 2

April 29, 1924.

R. B. JOHNSTON 1,492,131

METHOD AND APPARATUS FOR SHELLING PALM NUTS

Filed July 28, 1923      3 Sheets-Sheet 3

INVENTOR
Robert B. Johnston
BY
Meyers & Cavanagh
ATTORNEYS

Patented Apr. 29, 1924.

1,492,131

UNITED STATES PATENT OFFICE.

ROBERT B. JOHNSTON, OF COLLINGSWOOD, NEW JERSEY, ASSIGNOR TO CHARLES T. WILSON COMPANY, INC., OF NEW YORK, N. Y., A CORPORATION OF NEW YORK.

METHOD AND APPARATUS FOR SHELLING PALM NUTS.

Application filed July 28, 1923. Serial No. 654,345.

*To all whom it may concern:*

Be it known that I, ROBERT B. JOHNSTON, a citizen of the United States, and resident of Collingswood, in the county of Camden and State of New Jersey, have invented certain new and useful Improvements in Methods and Apparatus for Shelling Palm Nuts, of which the following is a specification.

This invention relates to a nut shelling method and apparatus, and more particularly to a method and apparatus for opening or shelling palm nuts or the like; and has special reference to the provision of an improved method and apparatus of the kind disclosed in my copending application Ser. No. 528,798 filed Jan. 12, 1922, of which this application is a continuation in part.

A prime desideratum of the invention comprehends the production of a method and apparatus adapted for opening tough stone-like shelled nuts such as the Babassu palm nut. The Babassu palm nut, a species of palm nuts occurring extensively in Brazil, grows in clusters or bunches on the Babassu palm tree, the bunches which may be about five feet long bearing about 700 nuts and having a total weight of approximately 150 pounds. Each of the nuts, which is about the size of a large lemon, weighs about one quarter of a pound and is composed of an outer fibre shell (pericarp) and a very hard inner shell (endocarp) encasing the kernels. The inner shell is from ⅜ to ¼ inch thick measured from the pericarp to the kernels and is composed of a hard, homogeneous stone-like substance interspersed with woody fibres running therethrough and running longitudinally of the nut. This endocarp or stone-like shell encases a plurality of oil bearing kernels, each of the kernels being encased by the stone walls of the endocarp, the number of kernels in a nut varying from 2 to 5, some more or less. The kernels of the Babassu nut are each about 1½ inches long and ⅜ of an inch thick and are richly laden with a useful oil, the kernels containing about 70 percent of a clear, light sweet oil used for edible and other purposes. The tough, hard and thick nut shells render the nut extremely difficult to crack, the cracking or shelling of the nut so that all the kernels are freed from their sacs or cavities where a maximum yield is desired and so that all the kernels are removed in a non-crushed or unbroken condition for the better preservation of the oils during shipment of the kernels being difficult of attainment.

Heretofore several methods of opening or shelling these nuts have been used, a common method employed consisting of the cracking of the nut by subjecting the same to heavy blows or crushing action. In the practice of such method the meat or kernels of the nut are often crushed, mashed or broken along with the shell, this being undesirable; and in the practice of this method it has been found very difficult to completely free the kernels from their enclosures or sacs so that the kernels may be removed with facility after the cracking operation. The provision of a method and apparatus in which the crushing or cracking of the shells is done away with and the crushing of the kernels obviated and in which the shell may be opened in a comparatively facile manner so that all the cavities or sacs are broken to liberate or free the kernels and thus render the subsequent removal of the same from the sacs a simple operation is a prime desideratum of my present invention.

As heretofore mentioned, the endocarp or hard interior shell is composed of a stone-like, homogeneous substance interpersed with wood-like fibres running longitudinally therethrough. These fibres render the hard shell grainy with the grain disposed longitudinally of the nut. This grain in the inner shell permits the nut to be severed and split longitudinally with comparative ease; and I have found that the nut may be severed along or with the nut grain into a plurality of longitudinal sections so that the kernels are freed from their enclosing walls in an uncrushed condition, with the kernels in condition ready to be picked or removed from their sacs; and the provision of a method and apparatus in which the nut is severed into a plurality of longitudinal sections and severed so as to free the kernels from their enclosures in the state desired, is a prime desideratum of my present invention.

As above indicated, the Babassu nut bears a number of kernels, the number ranging from 2 to 5, some more or less. In order to obtain a maximum yield of kernels during shelling of the nut I have found it desirable to sever the nuts so that all the kernel sacs may be opened in a single shelling step and the provision of a method and apparatus for accomplishing this end is another prime desideratum of my invention. Each of the kernels is housed in the shell and the kernels are spaced in the shell circumferentially of the nut and in a substantially symmetrical manner. In the practice of my method to attain the desired end the nut is severed into a plurality of substantially similar longitudinal and preferably wedge shaped sections, the nut being opened in a symmetrical manner to break through all of the kernel enclosures.

The principal objects of my present invention more specifically may be said to include the provision of a method of and apparatus for opening or shelling palm nuts in which the nut is severed into a plurality of longitudinal or wedge-shaped sections and the said sections split or spread apart during the severing operation so that the severing takes place for only part of a nut length, this preventing or minimizing the cutting into the kernels themselves; the further provision of such a method in which the severing and splitting of the nut takes place progressively from both ends of the nut towards the center, the severing and splitting of the nut into its sections being effected for a length less than the full length of the nut and so that the nut is opened at one end and the sections held together at the other end in cluster formation; the further provision of a method of and apparatus for opening the nuts in which the nut is subjected to a combined severing, spreading and twisting action so that the dismembered nut is effectively opened, the kernels properly freed from their sacs, and the cutting knives loosened from the nut sections; the further provision of an apparatus for carrying out the method which may be operated by a native and in which shelling of the nuts may be accomplished on the field without the necessity of shipping the heavy nuts to a remote shelling station; and the provision of a method and apparatus of the kind referred to which may be carried on and operated with facility for obtaining a large yield at a low operating cost.

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which:

Figure 4:
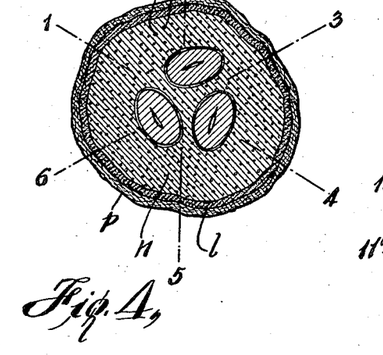
Fig. 4 is a cross-sectional view of the Babassu nut showing the constitution of said nut and the manner of opening or shelling the same.

Referring first to Fig. 4 of the drawings, the Babassu nut shown in cross-section in said figure is composed of an outer shell or pericarp $p$ which is about $\frac{1}{16}$ of an inch thick, and an inner shell (endocarp) $n$, the said inner shell being substantially one-half of an inch thick, and an intermediate layer $l$ separating the pericarp from the endocarp, the said layer being of a relatively soft substance and simulating cork in appearance. Encased in the inner shell $n$ are a plurality, as for example, three kernels disposed longitudinally of the nut and spaced circumferentially thereof in somewhat of a symmetrical condition, each of the kernels being substantially completely housed by the inner shell. As the nuts ripen the kernels shrink away from the walls of their sacs as shown in said figure. The inner shell $n$ is composed as heretofore mentioned of a hard stone-like substance interspersed with woody fibres $f$ running therethrough and longitudinally of the nut.

In the practice of the invention as heretofore referred to, the nut is severed along longitudinal planes so that the nut is divided into a plurality of longitudinal sections, the nut being cut along or with the longitudinal grain thereof; and in the preferred practice of the invention the severing of the nut is accomplished along planes radiating from the axis of the nut, with the planes intersecting the walls of the sacs or cavities of the kernels. Preferably also the number of planes along which the nut is cut exceeds the number of kernels in the nut so that all the kernel sacs may be broken irrespective of the positioning of the nut with respect to the cutting mechanism. This is shown in Fig. 4 of the drawings, for example, the cutting planes being therein indicated as 1, 2, 3, 4, 5 and 6, the said planes radiating from the axis of the nut so that the nut is severed into a plurality of substantially wedge-shaped sections as indicated in the figure.

Figure 5:
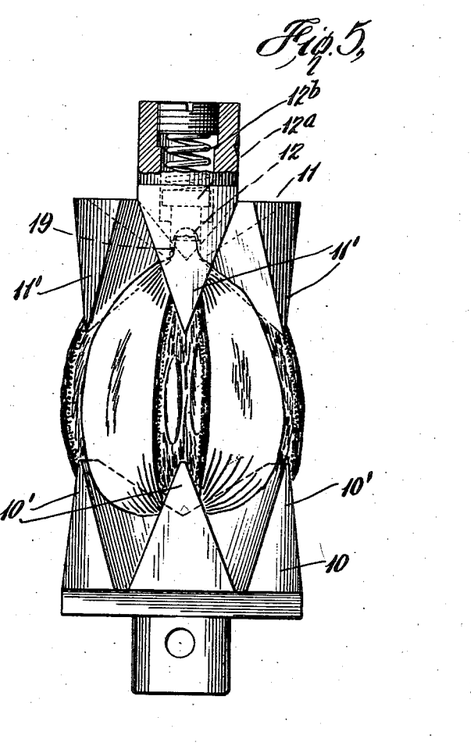
Fig. 5 is an enlarged fragmentary view of parts of the apparatus and showing the manner in which the nut is shelled or opened.
Figure 6:
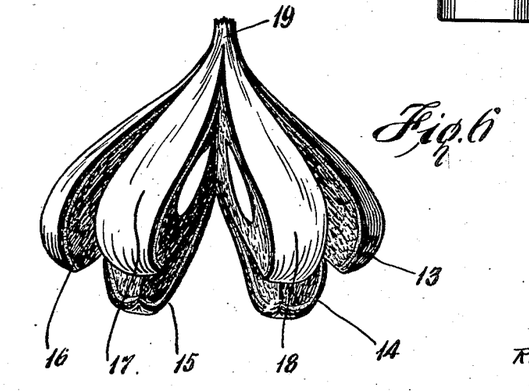
Fig. 6 is a perspective view of the nut when opened in accordance with the practice of the invention.

In the preferred practice of the invention the severing or cutting of the nut is accomplished by means of opposed cutting members constructed and operated to cut into the nut from opposite ends thereof progressively towards the center, the cutting operation being depicted for example in Fig. 5 of the drawings. These cutting members comprise more specifically a lower cutting member 10 provided with a plurality of blades or knives 10', 10', which in the preferred construction are six in number, the said knives being arranged in planes running longitudinally of the cutting member and preferably in planes radiating from a common axis, and an upper cutting member 11 also provided with a plurality of blades or knives 11', 11' equal in number to the knives of the lower cutting member and arranged in alinement therewith. In the practice of the method the Babassu nut is positioned relatively to the opposed cutting members 10 and 11 so that the axis of the nut is substantially in alinement with the common axis of the cutting members as clearly shown in Figs. 1 and 5 of the drawings, and with the nut so positioned the cutting members are moved relatively to each other and are forced into the opposite ends of the nut as will be apparent.

For the purpose of preventing injury or damage to the kernels themselves, I have found it desirable to cut or sever the nut in such a manner as to prevent the cutting into the kernels by the cutting members. To this end the nut is severed along its longitudinal planes preferably for a length less than the full length of the nut and more specifically for a length of about ¼ of an inch on each end, and the severed sections are progressively spread apart so that the remaining portions of the nut may be split apart, this being accomplished by constructing the blades or knives in the form of wedge-shaped elements as clearly shown in the drawings. In the practice of the method each of the knives simultaneously cuts the nut into its sections and spreads the said sections apart.

Desirably the splitting and spreading of the nut into its sections is effected for a length less than the full length of the nut and so that the nut is opened at one end and the wedge-shaped sections 13, 14, 15, 16, 17 and 18 held together at the unbroken or uncut end 19 in cluster formation, this so that the dismembered nut may be economically handled after the opening operation for removal of any of the kernels which may not have been liberated during the opening step, the handling of the nut in such cluster form being accomplished with great convenience. To effect this desired result, the knives of the cutting members are appropriately contoured, the relative movement of the cutters predetermined as will be described more in detail hereinafter, and the upper cutting member 11 provided with a recess or depression 12 in the center thereof for locating the upper end, nub or teat of each nut as clearly appears in Fig. 5 of the drawings. Preferably the recess or depression 12 is defined by a central bore provided in the upper cutter 11 and by a movable plunger 12$^a$ spring pressed by means of a spring 12$^b$ housed by the upper cutter as is clearly shown especially in Fig. 5 of the drawings, the construction being such that the nub or teat at the upper end of the nut is resiliently accommodated in the said depression and the cutting started without too great an end to end pressure being brought to bear upon the nut.

Although it is preferred to provide a cutting member having about six blades or knives as shown in the drawings, this to the end of providing for means for cutting through all of the kernel sacs, my invention also contemplates a variation in the number of knives or blades used.

For the purpose of seating the nut in the cutting members and for the further purpose of effecting a deeper cut in the exterior portions of the shell so as to further minimize the breaking into the kernels themselves, the knives or blades 10' and 11' are fashioned or contoured to provide pocketed seats for accommodating opposite end portions of the nut, as will clearly appear from a consideration of the drawings.

Figure 1:
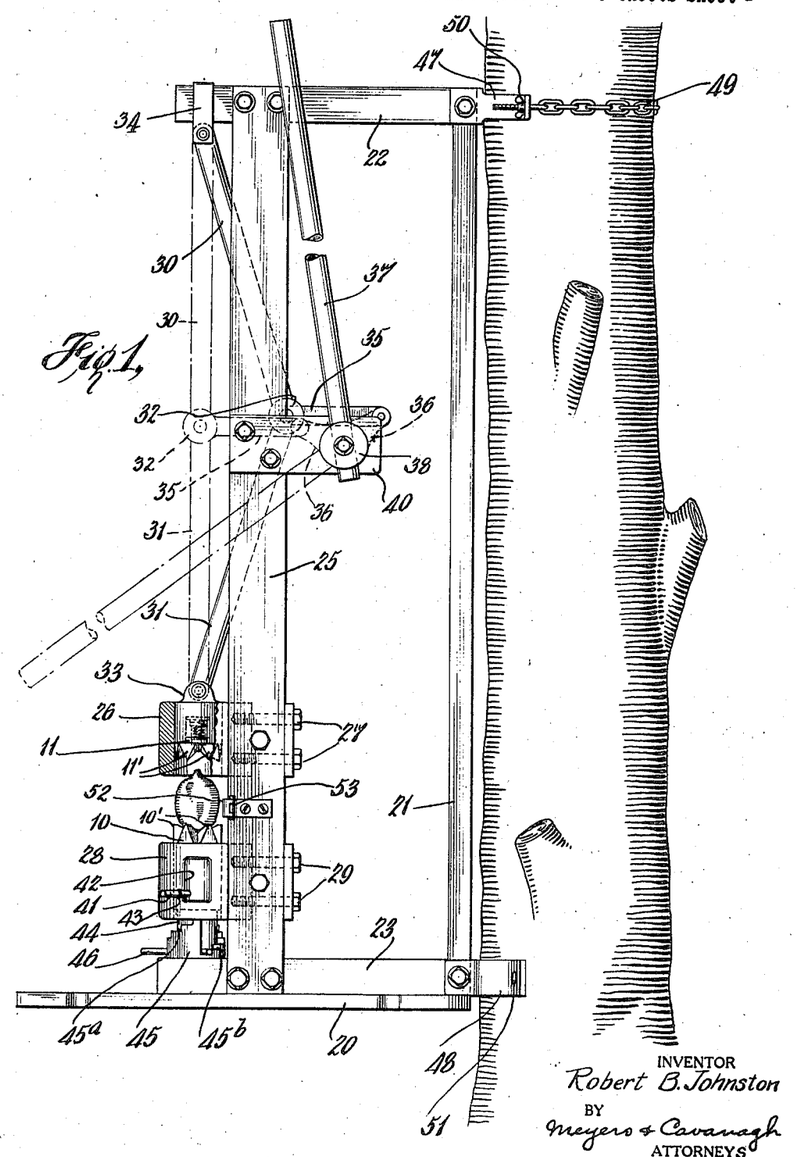
Fig. 1 is a side elevational view of my apparatus showing its attachment to the trunk of a tree.
Figure 2:
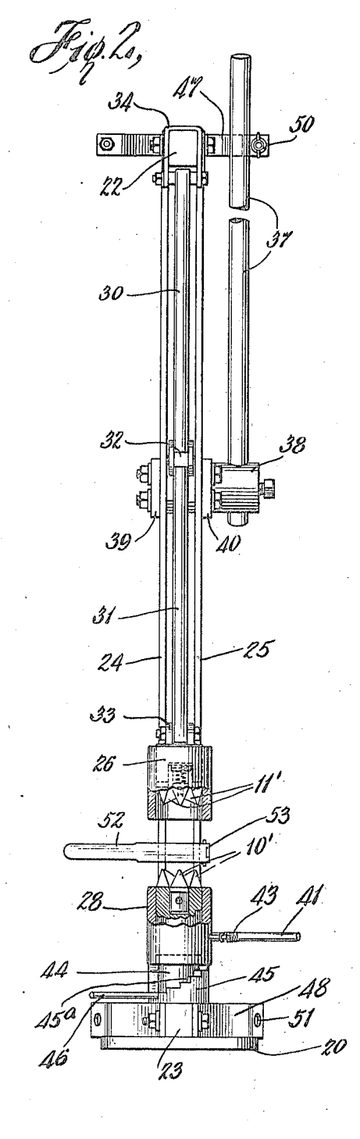
Fig. 2 is a front elevational view thereof.
Figure 3:
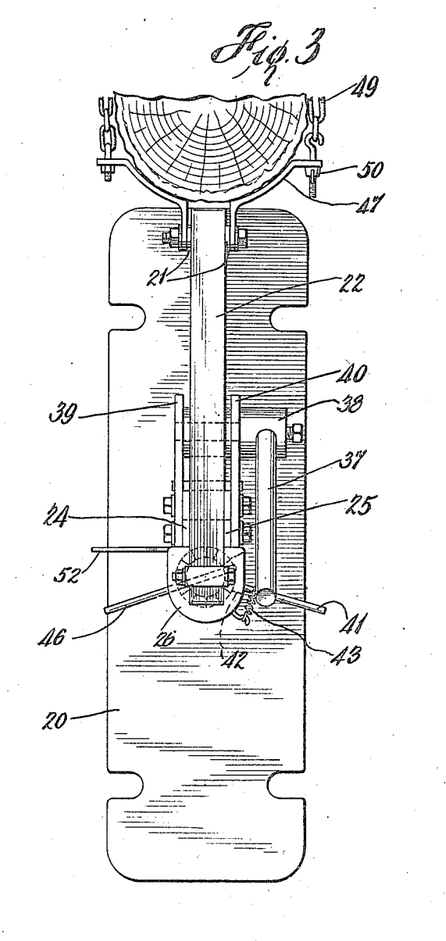
Fig. 3 is a plan view thereof.

Referring now more particularly to the apparatus utilized in practicing the method, and having reference to Figs. 1 to 3 of the drawings, I provide a frame or structure comprising the bottom support 20, a rear column 21 from which extends forwardly the top and bottom bars 22 and 23 respectively, the said bars being connected together by means of the upright bars 24 and 25, these parts of the framework being securely bolted together in any approved manner. Connected to the upright bars 24 and 25, I provide the guide sleeve 26 secured to the bars by means of the bolting 27 and slidably mounted in the guide sleeve is the plunger or upper cutting member 11 heretofore referred to, the said cutting member being arranged to be movable to and from the cutting member 10 which is located in a lower guide sleeve 28 also fixedly attached to the upright bars 24 and 25 by means of the bolting 29, the nut to be shelled being positionable between the cutting members.

In the present embodiment of my apparatus the nuts are preferably fed by hand between the upper and lower cutting members, although my invention contemplates the feeding of the nuts automatically; and in the present exemplification of my invention I prefer to operate the plunger or upper cutter by hand, adapting the apparatus to the individual use of the native, the upper cutter being preferably operated by means of a toggle link mechanism which comprises the toggle links 30 and 31 connected together as at 32, the lower end of the link 31 being pivotally connected to the upstanding ears 33 of the upper cutter 11, the upper end of the toggle link 30 being pivotally connected to the side plates 34 attached to the upper bar 22; and connected to the adjacent and attached ends of the toggle links I provide the connecting link 35 which is attached to and operated by a crank 36 which in turn is movable by means of a hand lever 37 adjustably securable in the block 38 forming part of the crank 36, these parts being journalled in the side plates 39 and 40 which are preferably bolted to the upright bars 24 and 25. These operating parts are so relatively arranged that the upper cutting member 11 is given a movement of predetermined distance, as for example about two inches, this movement having been found sufficient to provide the desired clearance in feeding the nuts between the cutting members and the cutting into the opposite ends of the nuts as heretofore described, the movement of the toggle link mechanism from the closed position shown in dotted lines in Fig. 1 to the broken position shown in full lines in said figure effecting the desired stroke of the upper cutter.

As heretofore mentioned, for the purpose of effecting a more pronounced spreading of the nut sections and for assuring the liberation of substantially all of the kernels from their sacs, the opening of the nut is accomplished by a combined severing, spreading and twisting action, this being preferably produced by first dividing the nut into the wedge-shaped sections by the relative axial movement of the upper and lower cutters and then by moving the cutters rotatably one relatively to the other. Preferably the upper cutter 11 is held against rotation and the lower cutter 10 is mounted so as to be rotatable in the guide sleeve 28 by means of a handle 41 operated through an opening 42 in the said sleeve, the opening 42 being of such dimensions as to limit the movement of the handle 41 to about ⅛ or 1/16 of a revolution. The handle 41 is controlled by means of a spring 43 to maintain the lower cutting member in its properly alined position, the said spring being operative also to return the handle and cutting member to such position after a manual operation thereof.

For the purpose of accomodating various sizes of nuts, the lower cutter 10 is axially adjustable by means of the complemental adjusting blocks 44 and 45, the block 44 supporting the lower cutter 10 and being rotatable in the stationary block 45 and in the guide sleeve 28 by means of a hand lever 46, the said lever being movable over and supported spacedly by the steps 45$^a$ and 45$^b$. To accommodate the desired range of nuts so as to allow a radius in which all known sizes of the Babassu nut may be handled with equal ease. I preferably provide six adjusting steps in the block 45, the said steps being in two sets arranged on opposite sides of the diameter of the block as clearly shown in the drawings.

For the purpose of utilizing my apparatus on the field at or near the nut growing region, I preferably construct the same so as to be suitably supported onto the trunk of a tree or like support, and to this end I provide means whereby the apparatus may be strapped in position on a tree trunk. To accomplish this the framework of the machine is provided with the top and bottom yokes 47 and 48 constructed to embrace the trunk of a tree as clearly shown in Fig 1 of the drawings. the upper yoke 47 being provided with the securing chain 49 adjustable by means of a thumb screw locking device 50. The bottom yoke 48 may conveniently be provided with the spaced bores 51 through which lag screws may be driven into the tree to more securely hold the machine when in operation.

For the purpose of extracting the dismembered nut from between the cutting knives, I also preferably provide an extractor or sweeping device which comprises a hand operated lever 52 hingedly attached as at 53 to the upright bar 25, the said lever being normally in the position shown in Figs. 1 and 2 of the drawings, and being movable from such position to eject the dismembered nut after a nut opening operation.

The practice of my method and the use and operation of my apparatus will in the main be fully apparent from the above detailed description thereof. When the nuts are fed by hand, they are positioned by inserting the pointed end of the nut in the depression in the center of the upper cutter 11 and the hand lever 37 is then pulled slightly to straighten or close the toggle links 30 and 31, forcing the upper cutter 11 into the nut and forcing the nut towards and into the lower cutter 10, which latter has been set to the proper height by operation of the lever 46. The nut is centered in the lower cutter which is made so as to help seat the nut centrally, and the pull on the operating lever is continued, resulting in the starting of breaking lines from top to bottom of the nut, and in the dividing of the nut into six wedge-shaped sections as the operation progresses. It has been noted that a snapping occurs when the proper amount of pressure and splitting has been effected, and at such time the operator ceases the pull exerted on the lever and moves the twisting lever 41 against the action of the spring 43, this turning the lower cutter in its bearing and effecting a widening of the cracks produced by the wedge-shaped cutters and the releasing of the kernels from the pockets or sacs in which they are held. The lower cutter is then automatically returned by the spring 43, and after the operating lever 37 is returned to its upper or inoperative position, the sweeping lever 52 is pulled for ejecting the broken nut from the machine. The severing and spreading of the nut from the bottom up and the top down is carried on for substantially the full length of the nut but falling short of the top so that all the sections are obtained in a cluster form shown in Fig. 5, this facilitating the subsequent handling of the nut and permitting those kernels which are retained in the cavities to be shaken from the nut in a simple manner.

While I have shown my device in the preferred form, it will be obvious that many changes and modifications may be made in the structure disclosed without departing from the spirit of the invention, defined in the following claims.

I claim:

1. The step in the method of shelling palm nuts or the like which consists in cutting into the nut at both ends thereof and severing the same along radial planes from each end progressively towards the center for separating the nut substantially the full length thereof into a plurality of wedge-shaped sections.

2. The step in the method of shelling palm nuts or the like which consists in cutting into the nut at both ends thereof and severing the same along radial planes from each end progressively towards the center for separating the nut into a plurality of wedge-shaped sections, the severing being effected for a length less than the full length of the nut.

3. The step in the method of shelling palm nuts or the like which consists in cutting into the nut at both ends thereof and severing the same along radial planes from each end progressively towards the center for separating the nut into a plurality of wedge-shaped sections, the severing being effected for a length less than the full length of the nut and so that the nut is opened at one end and the sections held together at the other end in cluster form.

4. The method of shelling palm nuts or the like which consists in cutting into the nut at both ends thereof severing the same from each end progressively towards the center along intersecting planes running longitudinally of the nut, and progressively spreading the nut from such ends towards the center into a plurality of sections.

5. The method of shelling palm nuts or the like which consists in cutting into the nut at both ends severing the same along radial planes from such ends progressively towards the center and progressively spreading the nut into a plurality of wedge-shaped sections, the severing and spreading being effected for a length less than the full length of the nut and so that the nut is opened at one end and the sections held together at the other end in cluster form.

6. The step in the method of shelling palm nuts or the like which consists in cutting into the nut at an end thereof severing the same along radial planes for separating the nut into a plurality of wedge-shaped sections, the severing being effected for a length less than the full length of the nut and so that the nut is opened at one end and the sections held together at the other end in cluster form.

7. The step in the method of shelling palm nuts or the like which consists in severing the nut along radial planes of the same and splitting the same into a plurality of wedge-shaped sections, the severing and splitting being effected for a length less than the full length of the nut and so that the nut is opened at one end and the sections held together at the other end in cluster form.

8. The steps in the method of shelling palm nuts or the like which consist in first severing the nut along radial planes of the same dividing the nut substantially the full length thereof into a plurality of wedge-shaped sections and in then twisting the so severed nut.

9. The steps in the method of shelling palm nuts or the like which consist in subjecting the nut to a cutting action dividing the nut substantially the full length thereof into a plurality of longitudinal sections and to a twisting action.

10. The method of shelling palm nuts or the like which consists in first severing the nut along radial planes of the same separating the nut substantially the full length thereof into a plurality of sections, spreading the sections apart, and in then twisting the nut.

11. The steps in the method of shelling palm nuts or the like which consist in cutting into the nut at both ends thereof severing the same substantially the full length thereof along radial planes from each end progressively towards the center and in twisting the nut.

12. The steps in the method of shelling palm nuts or the like which consist in first cutting into the nut at both ends thereof severing the same along radial planes from each end progressively towards the center for separating the nut substantially the full length thereof into a plurality of wedge-shaped sections and then twisting the severed nut.

13. The steps in the method of shelling palm nuts or the like which consist in cutting into the nut at both ends thereof severing the same along radial planes from each end progressively towards the center for separating the nut into a plurality of wedge-shaped sections, the severing being effected for a length less than the full length of the nut and so that the nut is opened at one end and the sections held together at the other end in cluster form, and in twisting the so severed nut.

14. An apparatus for shelling palm nuts or the like comprising a cutting member including a plurality of knives arranged about a common axis, the cutting edges of the knives being contoured and the knives relatively arranged for defining a pocketed seat accommodating the end portion of a palm nut, the palm nuts being adapted to be positioned relatively to the knives with the axis of the former substantially aligned with the common axis of the latter, and means for forcing the cutting member and nut so positioned one into the other, the said knives being wedge shaped so as to effect a combined severing of the nut into sections and a spreading apart of such sections.

15. In an apparatus for shelling palm nuts or the like, a cutting member comprising a plurality of knives arranged about a common axis, the cutting edges of the knives being contoured and the knives relatively arranged for defining a pocketed seat for accommodating the end portion of a palm nut so that the palm nut may be positioned relatively to the knives with the axis of the former substantially aligned with the common axis of the latter, the said knives being wedge shaped so as to effect a combined severing of the nut into sections and a spreading apart of such sections.

16. An apparatus for shelling palm nuts or the like, comprising a cutting member including a plurality of knives arranged about a common axis, the cutting edges of the knives being contoured and the knives relatively arranged to provide a pocketed seat for accommodating the end portion of a palm nut so that the palm nut may be positioned relatively to the knives with the axis of the former substantially aligned with the common axis of the latter, a plunger providing means for seating the other end of the nut, and means for relatively moving the cutting member and plunger, the said knives being wedge shaped so as to effect a combined severing of the nut into sections and a spreading apart of such sections.

17. An apparatus for shelling palm nuts or the like, comprising a cutting member including a plurality of knives arranged about a common axis, the cutting edges of the knives being contoured and the knives relatively arranged to provide a pocketed seat for accommodating the end portion of a palm nut so that the palm nut may be positioned relatively to the knives with the axis of the former substantially aligned with the common axis of the latter, a plunger providing means for seating the other end of the nut, and means for moving the plunger to and from the cutting member, the said knives being wedge shaped so as to effect a combined severing of the nut into sections and a spreading apart of such sections.

18. An apparatus for shelling palm nuts or the like comprising opposed cutting members each including a plurality of knives arranged about a common axis, the cutting edges of the knives being contoured and the knives relatively arranged to provide a pocketed seat for accommodating the ends of the palm nut so that the palm nut may be positioned relatively to the knives with the axis of the former substantially alined with the common axis of the latter, and means for relatively moving the cutting members, the knives of each of the cutting members being wedge shaped so as to effect a combined severing of the nut into sections and a spreading apart of such sections.

19. An apparatus for shelling palm nuts or the like comprising a lower cutting member including a plurality of knives, an upper cutting member including a plurality of knives, the said cutting members being arranged for relative movement and being contoured to cut into opposite ends of a palm nut or the like for severing the same for substantially the full length thereof into a plurality of wedge-shaped sections, and means for relatively moving the cutting members.

20. An apparatus for shelling palm nuts or the like comprising relatively movable members, at least one of said members comprising a cutting member having a plurality of knives radiating from a common axis and means for predetermining the relative movement of the members so that a nut positioned therebetween will be severed into a plurality of wedged-shaped sections for a length less than the full length of the nut and so that the nut is opened at one end and the sections held together at the other end in cluster form.

21. An apparatus for shelling palm nuts or the like comprising relatively movable members, at least one of said members comprising a cutting member having a plurality of knives radiating from a common axis, the cutting edges of the knives being contoured for defining a pocketed seat, and means for predetermining the relative movement of the members so that a nut positioned therebetween will be severed into a plurality of wedge-shaped sections for a length less than the full length of the nut and so that the nut is opened at one end and the sections held together at the other end in cluster form.

22. An apparatus for shelling palm nuts or the like comprising opposed cutting members each including a plurality of knives arranged radially about a common axis, the said cutting members being arranged for relative movement to cut into opposite ends of a palm nut or the like for severing the same into a plurality of wedge-shaped sections, the knives being contoured so that the severing is effected for a length less than the full length of the nut and so that the nut is opened at one end and the sections held together at the other end in cluster form.

23. An apparatus for shelling palm nuts or the like comprising opposed cutting members each including a plurality of knives radiating from a common axis, the said knives being contoured to provide opposed seats for a palm nut positioned therebetween, and means for relatively moving the cutting members to sever the nut into a plurality of wedge-shaped sections, the contour of the knives being such that the severing is effected for a length less than the full length of the nut and so that the nut is opened at one end and the sections held together at the other end in cluster form.

24. An apparatus for shelling palm nuts or the like comprising means for severing the nut substantially the full length thereof into a plurality of longitudinal sections and for twisting the nut.

25. An apparatus for shelling palm nuts or the like comprising means for severing the nut along radial planes to divide the same substantially the full length thereof into a plurality of wedge-shaped sections, and means for twisting the severed nut.

26. An apparatus for shelling palm nuts or the like comprising means for severing the nut substantially the full length thereof into a plurality of longitudinal sections and spreading the sections apart, and means for twisting the nut.

27. An apparatus for shelling palm nuts or the like comprising means including a cutting member for severing the nut into a plurality of wedge-shaped sections held together in cluster form and means for twisting the nut.

28. An apparatus for shelling palm nuts or the like comprising nut severing means including a plurality of opposed cutting members adapted for severing the nut into a plurality of longitudinal sections held together in cluster form, and nut twisting means.

29. An apparatus for shelling palm nuts or the like comprising means including opposed cutting members for severing the nut along radial planes to divide the same substantially the full length thereof into a plurality of wedge-shaped sections, and means for twisting the severed nut.

30. An apparatus for shelling palm nuts or the like comprising opposed cutting members each including a plurality of knives radiating from a common axis, the said cutting members being arranged for relative movement and being contoured to cut into a nut from opposite ends progressively towards the center for severing the same into a plurality of wedge-shaped sections, and means for twisting the nut.

31. An apparatus for shelling palm nuts or the like comprising a lower cutting member including a plurality of wedge-shaped knives radiating from a common axis, an upper cutting member also including a plurality of wedge-shaped knives radiating from a common axis and aligned with the knives of the lower cutting member, said knives being contoured to seat opposite ends of the nut and to cut into the opposite ends of the nut to sever the same into a plurality of wedge-shaped sections with the severing effected for a length less than the full length of the nut and so that the nut is opened at one end and the sections held together at the other end in cluster form, and means for twisting the so severed nut.

32. An apparatus for shelling palm nuts or the like comprising a frame, a cutting member carried by the frame, said cutting member including a plurality of knives radiating from a common axis, the knives being wedge shaped so as to effect a combined cutting and spreading action on the nut, the cutting edges of the knives being contoured and the knives relatively arranged for defining a pocketed seat for accommodating the end portion of a palm nut, a guide, a plunger movable in the guide to and from the cutting member, a toggle link mechanism for moving the plunger and a hand operated lever means connected to the toggle mechanism for operating the same.

33. An apparatus for shelling palm nuts or the like comprising a lower cutting member having a plurality of knives, an upper cutting member having a plurality of knives, means for axially moving the upper cutting member, and means for rotating the lower cutting member.

34. An apparatus for shelling palm nuts or the like comprising relatively movable upper and lower members at least one of which comprises a cutting member, means for axially moving one of said members, and means for axially adjusting other of said members.

35. An apparatus for shelling palm nuts or the like comprising a lower cutting member having a plurality of knives, an upper cutting member having a plurality of knives, means for axially moving the upper cutting member, and means for axially adjusting the lower cutting member.

36. An apparatus for shelling palm nuts or the like comprising a lower cutting member having a plurality of knives, an upper cutting member having a plurality of knives, means for axially moving the upper cutting member, means for axially adjusting the lower cutting member, and means for twisting the lower cutting member.

Signed at Gloucester City, in the county of Camden and State of New Jersey, this 24th day of July, A. D. 1923.

ROBERT B. JOHNSTON.